(12) United States Patent
Hasific et al.

(10) Patent No.: US 12,521,944 B2
(45) Date of Patent: Jan. 13, 2026

(54) DRYING METHOD

(71) Applicant: Georg Fischer Rohrleitungssysteme AG, Schaffhausen (CH)

(72) Inventors: Edin Hasific, Schaffhausen (CH); Juergen Roesch, Lenzkirch (DE); Mariano Gutierrez, Kreuzlingen (CH); Benedikt Engesser, Hochemmingen (DE)

(73) Assignee: Georg Fischer Rohrleitungssysteme AG, Schaffhausen (CH)

( * ) Notice: Subject to any disclaimer, the term of this patent is extended or adjusted under 35 U.S.C. 154(b) by 151 days.

(21) Appl. No.: 18/592,700

(22) Filed: Mar. 1, 2024

(65) Prior Publication Data

US 2024/0293979 A1     Sep. 5, 2024

(30) Foreign Application Priority Data

Mar. 2, 2023    (EP) .................................. 23159536

(51) Int. Cl.
*B29C 65/18*     (2006.01)
*B29C 65/00*     (2006.01)
(Continued)

(52) U.S. Cl.
CPC ........ *B29C 66/034* (2013.01); *B29C 66/1142* (2013.01); *B29C 66/5221* (2013.01); *B29L 2023/22* (2013.01)

(58) Field of Classification Search
CPC . B29C 37/0092; B29C 65/14; B29C 65/1403; B29C 65/1412; B29C 65/1416; B29C 65/1419; B29C 65/1422; B29C 65/1429; B29C 65/1432; B29C 65/1445; B29C 65/1448; B29C 65/18; B29C 65/20; B29C 65/2092; B29C 65/78; B29C 65/7802; B29C 65/782; B29C 65/7841; B29C 66/02; B29C 66/022; B29C 66/0224; B29C 66/02241; B29C 66/02245; B29C 66/024; B29C 66/0242; B29C 66/114; B29C 66/1142; B29C 66/522; B29C 66/5221; B29C 66/7392; B29C 66/73921; B29C 66/9121; B29C 66/91211; B29C 66/9122; B29C 66/91216; B29C 66/91221; B29C 66/29411; B29C 66/91431; B29C 66/91441; B29C 66/92611; B29C 66/92613; B29C 66/92615;
(Continued)

(56) References Cited

U.S. PATENT DOCUMENTS 4,531,308 A  *  7/1985  Neilson .................. F26B 17/16
                                                     34/174
5,241,157 A      8/1993  Wermelinger et al.
(Continued)

FOREIGN PATENT DOCUMENTS

EP     0899083 A2    3/1999
JP     H08156102 A   6/1996
WO     2016102291 A1 6/2016

*Primary Examiner* — Michael A Tolin
(74) *Attorney, Agent, or Firm* — Harness, Dickey & Pierce, P.L.C.

(57) ABSTRACT

A method for welding hygroscopic plastics parts, preferably pipeline components, by means of a butt-welding machine, wherein the two plastics parts are clamped and fixed in a coaxial position in relation to one another by means of a clamping device.

9 Claims, 1 Drawing Sheet

(51) Int. Cl.
*B29C 65/20* (2006.01)
*B29L 23/00* (2006.01)

(58) Field of Classification Search
CPC ... B29C 66/9532; B29C 66/96; B29C 66/961; B29D 23/001; B29D 23/003
See application file for complete search history.

(56) References Cited

U.S. PATENT DOCUMENTS 5,660,669 A * 8/1997 Mittleider ............. B29C 66/721
    156/359
9,486,971 B2 * 11/2016 Zieger ................... B29C 65/782

* cited by examiner

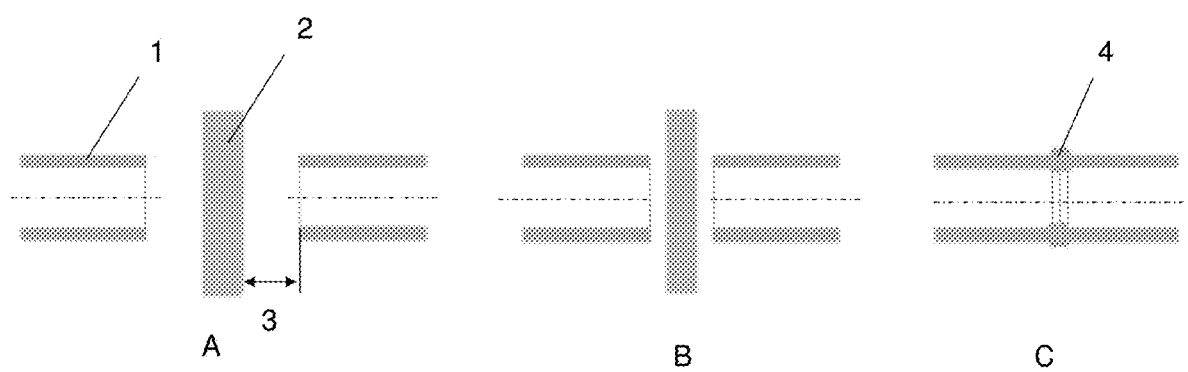

DRYING METHOD

CROSS-REFERENCE TO RELATED APPLICATIONS

This application claims the benefit of European Patent Application No. 23 159 536.4 filed Mar. 2, 2023. The entire disclosure of the above application is incorporated herein by reference.

BACKGROUND OF THE INVENTION

Technical Field

A method for welding hygroscopic plastics parts, preferably pipeline components, by means of a butt-welding machine, wherein the two plastics parts are clamped and fixed in a coaxial position in relation to one another by means of a clamping device, wherein the mutually opposite end faces of the plastics parts are planed flat by means of a planer which can be brought in between them, and the ends of the plastics parts are melted by means of a heating mirror that can be brought between them, wherein the heating mirror is disposed at a spacing from the end faces of the ends of the plastics parts, in order to achieve the required heat for the melting operation, wherein the ends of the plastics parts are joined together after the melting operation.

Such methods for welding plastics parts are known from the prior art, but to that end use is made of thermoplastic materials that are not hygroscopic.

Discussion

EP 0 899 083 discloses a method according to the preferred embodiment of the invention, but it would not be suitable for hygroscopic plastics unless the plastics parts were dried beforehand. It is known from the prior art that such drying is performed in advance as a separate additional working step, usually in a heating cabinet, in order to ensure that the plastic does not contain, or scarcely contains, any moisture, since the latter would cause moisture blisters during the welding. This correspondingly requires a lot of time and energy expenditure in order to be able to weld hygroscopic plastics parts to one another.

An aspect of the invention is to propose a method which makes it possible to weld hygroscopic plastics parts to one another without it being necessary to dry the plastics parts beforehand in order to remove moisture from the plastics part.

SUMMARY

This aspect is achieved in that the ends of the plastics parts are dried while the plastics parts are being fixed on the butt-welding unit, wherein the drying is performed by the heating mirror disposed between the ends of the plastics parts.

In the case of the method according to the preferred embodiment of the invention for welding hygroscopic plastics parts, preferably pipeline components, by means of a butt-welding machine, the two plastics parts are clamped and fixed in a coaxial position relative to one another by means of a clamping device. The fixed plastics parts can be axially moved by means of the clamping device, in order to reach the various positions during the welding method. A drive and a controller, which perform the welding process in accordance with the specified data, are preferably present for this. The pipeline components welded together or to one another are preferably fittings and/or pipes. After the plastics parts have been clamped or fixed, preferably by the clamping devices of the butt-welding machine, the mutually facing end faces of the plastics parts are planed flat by means of a planer which can be brought in between them. The ends of the plastics parts are preferably planed flat to a certain extent, such that the end faces define a zero point.

The planed ends of the plastics parts are then melted by means of a heating mirror that can be brought between them and is disposed between the plastics parts instead of the planer.

The heating mirror is disposed at a spacing from the end faces of the ends of the plastics parts, in order to achieve the heat required to melt them. The welding method according to the preferred embodiment of the invention is preferably performed by means of an infrared heating mirror and is accordingly contactless, that is to say the heat is applied to the ends of the plastics parts by heat radiation and convection.

Following the melting operation, the ends of the plastics parts are joined together after the heating mirror in between them has been removed.

In order to obtain a weld seam that meets the requirements, it must be ensured that the plastics parts comprise no moisture, or do not comprise excessive moisture. In the case of the method according to the preferred embodiment of the invention, the moisture in the hygroscopic plastics parts is extracted, so that they contain no moisture or at least only little enough moisture that a weld seam that meets the requirements can be obtained. For this, the ends of the plastics parts are dried while the plastics parts are being fixed on the butt-welding machine, wherein the drying is implemented by the heating mirror disposed between the ends of the plastics parts. The heat radiation from the heating mirror and the prevailing convection have the effect that the welding zones of the ends of the plastics parts are correspondingly dried. Since only the welding zones and not the entire plastics part are/is dried, it is possible to save on an amount of energy.

The ends of the plastics parts are preferably dried after the planing operation. After the planing operation, the ends of the plastics parts have been brought to an exact dimension, as a result of which the precise position of the end sides is known and the spacing between the end faces and the heating mirror can be precisely defined, as a result of which the transferred heat for drying can be regulated via the spacing. In addition, a trimming operation in advance avoids the expenditure of energy for drying material which will subsequently be removed by planing.

A preferred embodiment has been shown to be disposing the end faces of the plastics parts at a greater spacing relative to the heating mirror for the drying than during the melting operation. As a result, the prevailing temperature at the end of the plastics parts is lower than in the case of melting without regulation of the temperature at the heating mirror.

It is advantageous that the drying takes place before the ends of the plastics parts are melted. In order that no moisture blisters are produced when the ends of the plastics parts are being melted, it is advantageous when the moisture is extracted beforehand by drying the ends of the plastics parts.

The drying is preferably carried out dynamically and the spacing between the end faces of the plastics parts and the heating mirror is regulated depending on the temperature prevailing at the end of the plastics parts, or the welding zone. This has the effect of a rapid adaptation of the temperature at the end of the plastics parts and optimum drying conditions are ensured. The time is preferably also correspondingly regulated. It has been shown to be advantageous when the data for the corresponding plastics parts are stored in memory in the controller, as a result of which the method is carried out autonomously when the plastics parts are identified. That is to say, the heating mirror preferably heats up to a predefined temperature and the spacings are carried out according to the method steps and the dwell time of the plastics parts at the corresponding positions.

It has been shown to be advantageous if the ends of the plastics parts are not melted during the drying. This prevents the formation of moisture blisters, since in that case melting would be performed without prior drying. Therefore, lower temperatures prevail at the end of the plastics parts during the drying than during the melting. The drying temperatures at the end of the plastics parts are preferably below the actual melting temperatures of the corresponding plastic.

It Is advantageous when, to determine the spacing after the planing operation, a zero-point check of the ends of the plastics parts is performed. This serves to be able to precisely ascertain the position of the end faces and thus precisely set the spacing.

It has been shown to be advantageous when the temperature of the heating mirror is kept constant during the drying. The drying temperature is regulated via the spacing between the end face of the plastics parts and the drying mirror. The prevailing temperatures at the welding zone of the plastics part are preferably monitored using a sensor and correspondingly regulated by setting the spacing.

The temperature of the heating mirror is preferably kept constant throughout the welding operation. Since a temperature modification at the heating mirror is slow, other parameters, such as spacing and time, are preferably modified in order to optimize the welding process.

It has also been shown to be advantageous if, to ascertain whether enough moisture was extracted from the plastics parts, the weight of the plastics part after the drying operation is ascertained, or the weight before and after the drying operation is ascertained and these two values are compared with one another. As an alternative, there is also the option of checking the welding zone using a moisture sensor to see how high the moisture content is. All of the configuration options can be freely combined with one another.

An exemplary embodiment of the invention will be described with reference to the FIGURE, the invention not being limited to just the exemplary embodiment. In the FIGURE:

BRIEF DESCRIPTION OF THE DRAWINGS

FIG. 1 shows a schematic representation of the sequence of the welding method according to the invention.

DESCRIPTION OF THE PREFERRED EMBODIMENTS OF THE INVENTION

The drawing represented in FIG. 1 shows a schematic representation of the method according to the preferred embodiment of the invention for welding hygroscopic plastics parts 1, preferably pipeline components. Pipeline components are understood to mean, in addition to pipelines, also fittings and other components which together can be welded to one another on a butt-welding machine. FIG. 1 shows the different steps of the method after the planing operation. Image A schematically shows the disposition of the plastics parts 1 with respect to the heating mirror 2 during the method step of drying. It can be clearly seen that the ends of the plastics parts 1 have a distance 3 from the heating mirror which is considerably greater than it is during the next method step of melting B. It can be clearly seen in image B that the distance 3 has been reduced, in order that a higher temperature is generated at the ends of the plastics parts, or in the welding zone, by moving the ends of the plastics parts 1 closer to the heating mirror 2. Since the drying is dynamic, the temperature in the welding zone is regulated by modifying the spacing 3 during the drying phase, in order to obtain optimum drying and avoid melting. Image C shows the position in which the melted ends of the plastics parts are joined together after the heating mirror has been removed and a weld seam 4 is formed.

What is claimed is:

1. A method for welding hygroscopic plastic parts, comprising:
    clamping two hygroscopic plastic parts and fixing the two plastic parts in a coaxial position in relation to one another with a clamp of a butt-welder,
    planing mutually opposed end faces of the two plastic parts with a planer positioned between the end faces such that the end faces are flat after planing,
    drying the end faces with a heating mirror disposed between the end faces while the two plastic parts are fixed in the butt-welder,
    melting the end faces with the heating mirror positioned between the end faces, wherein the heating mirror is disposed at a spacing from each of the end faces in order to provide required heat for melting, and
    joining the ends of the plastic parts together after the step of melting.

2. The method according to claim 1, wherein the end faces are dried after the step of planing.

3. The method according to claim 1, wherein the heating mirror is disposed at a first spacing from each of the end faces during the step of drying, the spacing between the heating mirror and each of the end faces during the step of melting is a second spacing, and the first spacing is greater than the second spacing.

4. The method according to claim 1, wherein the end faces are dried before the step of melting.

5. The method according to claim 1, wherein the step of drying is carried out dynamically such that a spacing between the end faces and the heating mirror is regulated depending on a temperature prevailing at the end faces.

6. The method according to claim 1, wherein the end faces are not melted during the step of drying.

7. The method according to claim 1, further comprising performing a zero-point check of the end faces after the step of planing to allow determination of spacing between the heating mirror and each of the end faces.

8. The method according to claim 1, wherein a temperature of the heating mirror is kept constant during the step of drying.

9. The method according to claim 1, wherein a temperature of the heating mirror is kept constant throughout the method for welding hygroscopic plastic parts.

* * * * *